Oct. 22, 1968 P. C. WILMARTH 3,407,330

PROTECTION CIRCUIT FOR CATHODE RAY TUBE

Filed Feb. 21, 1966

INVENTOR.
Paul C. Wilmarth
BY
Eugene M. Whitacre
Attorney

United States Patent Office 3,407,330

Patented Oct. 22, 1968

3,407,330

PROTECTION CIRCUIT FOR CATHODE RAY TUBE

Paul C. Wilmarth, Indianapolis, Ind., assignor to Radio Corporation of America, a corporation of Delaware Filed Feb. 21, 1966, Ser. No. 529,014
3 Claims. (Cl. 315—20)

ABSTRACT OF THE DISCLOSURE

The beam current of a cathode ray tube is maintained at a level to effect discharge of the accelerating anode, thus preventing burn out of the tube face at the point where the beam will strike in absence of the deflecting fields. A voltage dependent resistor is provided to maintain the control grid at a constant potential while the cathode voltage decreases when the tube power is cut off.

Figures 1, 2:
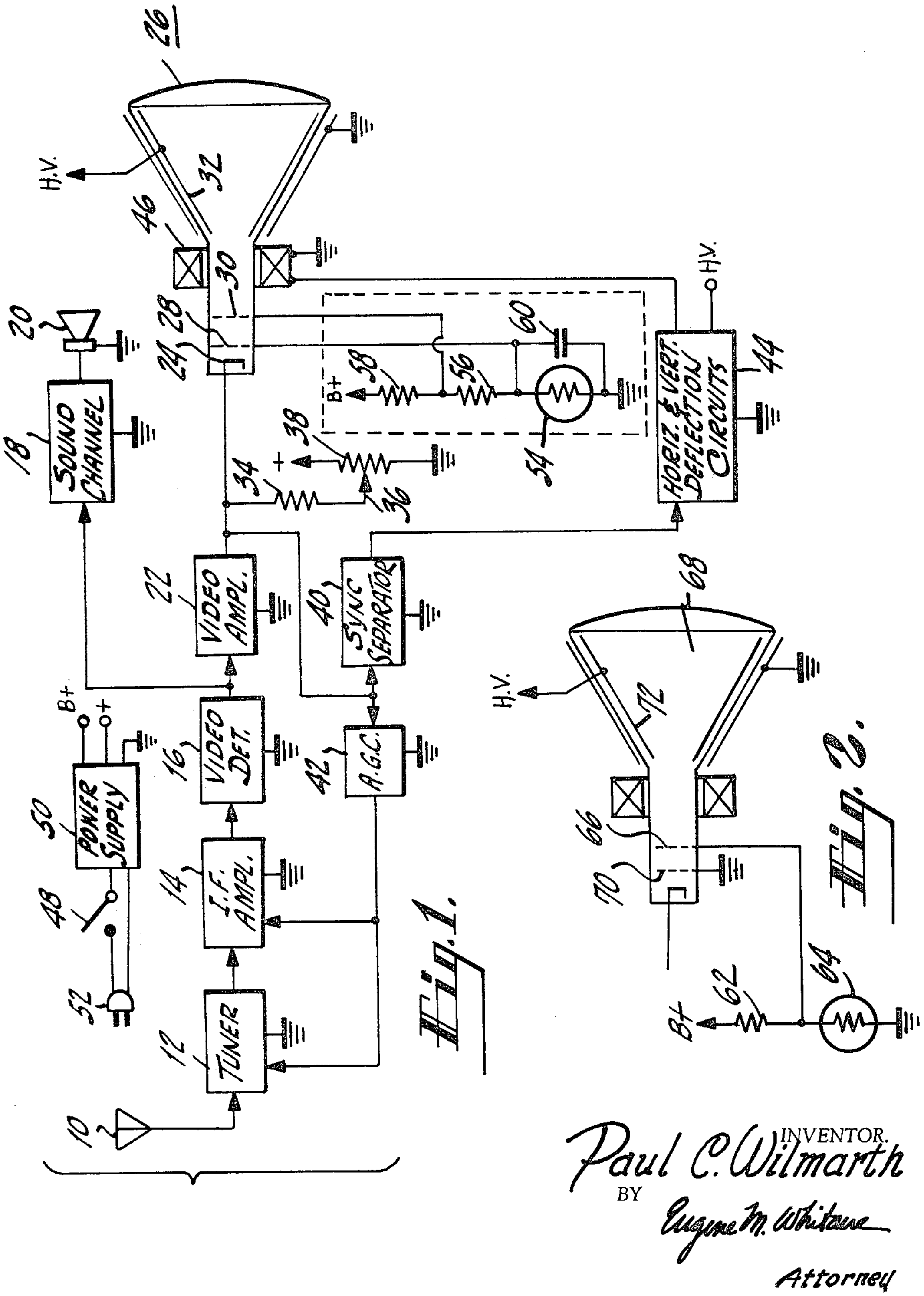

This invention relates to protection circuits for cathode ray tubes, and in particular to circuits for preventing a bright spot from appearing on the screen of a cathode ray tube after the power for an instrument incorporating the cathode ray tube has been turned off.

In apparatus such as television receivers, for example, it is not unusual to find that a bright spot appears near the center of the picture tube screen when the power has been turned off. This spot, which may damage the phosphor screen material, is produced as the result of the picture tube cathode emission and accelerating anode voltage decaying more slowly than the deflection fields.

To avoid the last mentioned effect, a neon lamp may be connected in series between B+ and the brightness control in the cathode circuit of the receiver with the picture tube control grid grounded. When the receiver power is cutoff, the path through the neon lamp opens and effectively cuts off the brightness control from the B+ thereby grounding the picture tube cathode and allowing discharge of the accelerating anode voltage through the brightness control to ground. However, the use of neon lamps does not permit flexibility of design in circuits of this type because economically suitable lamps have a firing voltage of the order of 50 volts. This requires that the picture tube electrode with which the neon tube is connected be raised from ground or lowered from B+ by a fixed amount determined by a relatively large firing voltage of the selected lamp.

It is an object of the present invention to provide an improved circuit for eliminating or substantially reducing the bright spot appearing on the screen of a cathode ray tube after the power for the instrument incorporating the cathode ray tube has been turned off.

In accordance with one embodiment of the invention the biasing network for the control electrode of a cathode ray tube includes a voltage dependent resistor such as a varistor, serially connected between a B+ dropping resistor and ground to provide a voltage dividing network for biasing the control grid to provide a desired grid to cathode potential for normal operation. When the power for the apparatus including the cathode ray tube is turned off, the B+ voltage decays, and the impedance of the varistor increases tending to hold the voltage at the control grid constant while the cathode voltage decreases. In this manner the beam current is maintained at a sufficient level to discharge the tube accelerating anode capacitance before the deflection fields collapse.

Since varistors are commercially available in a wide range of voltage values and resistance characteristics, the use of such a device in the divider network allows a considerable design freedom over control grid bias voltages while inherently providing protection against the appearance of a bright spot when the apparatus power is turned off.

The novel features that are considered to be characteristic of this invention are set forth with particularity in the appended claims. The invention itself, however, both as to its organization and method of operation will best be understood when read in connection with the accompanying drawings, in which:

FIGURE 1 is a partial block diagram of a television receiver and illustrates schematically the circuit details of an embodiment of the present invention; and FIGURE 2 illustrates schematically the circuit details of another embodiment of the present invention as applied to the receiver block diagram shown in FIGURE 1.

Referring now to the drawing, and in particular to FIGURE 1, there is shown a television receiver which may include an antenna 10 for intercepting a radio frequency television signal and which is coupled to apply the received signal to a tuner 12. The tuner 12 may include, as is known, a radio frequency (R.F.) amplifier and a frequency converter for converting the received radio frequency signal to an intermediate frequency signal. The intermediate frequency signal derived from the tuner 12 is amplified by an intermediate frequency (I.F.) amplifier 14 and applied to a video detector stage 16 which is operative to separate the sound information from from the I.F. signal and to recover the video signal information from the intermediate frequency signal. The sound information is then coupled to the sound channel 18 of the receiver where it is processed to drive the usual loudspeaker or sound reproducing means 20. From the video detector, the video signal is coupled through a video amplifier 22 to the cathode electrode 24 of a cathode ray or picture tube 26. The picture tube 26 includes a first control grid 28, for controlling the intensity of the cathode ray beam, first anode or second grid 30 and second or accelerating anode 32 which is connected to the usual aquadag coating on the inside wall of the tube envelope. The cathode circuit of the picture tube 26 includes a resistor 34 connected between picture tube cathode 24 and the wiper 36 of a brightness control potentiometer 38. Potentiometer 38 is connected between a positive voltage source and ground to couple a selected portion of the voltage developed thereacross through resistor 34 to the the picture tube cathode 24 to vary the overall screen illumination in a manner known in the art.

The video amplifier 22 also supplies signals for the sync separator 40 and AGC circuits 42 of the receiver. The sync separator is connected to the horizontal and vertical deflection circuits 44 which drive a yoke 46 positioned on the neck of the picture tube 26. The necessary high voltage for the accelerating or second anode 32 of the picture tube 26 is derived from the horizontal deflection circuits 44 in a manner understood by those skilled in the art. The output control voltage from the AGC circuit 42 is connected to the I.F. amplifier 14 and the tuner 12 in the usual manner for automatic gain control. Receiver power is controlled by means of an on-off switch 48 serially connected between the receiver power supply 50 and its A.C. power input plug 52.

With normal biasing of the picture tube, a spot will appear at the center of the picture tube screen after the receiver power is turned off. This is due to the fact that the picture tube accelerating anode 32 has a sizeable capacitance constitued by the conductive aquadag layer deposited inside and outside of the tube envelope. When the receiver power is turned off, and particularly under low screen brightness conditions, this capacitance discharges slowly through the decaying cathode ray beam and after the deflection fields collapse is visible as a bright stationary spot until the remaining charge is insufficient to maintain further current flow of the cathode ray beam. This spot may remain long enough to eventually damage the phosphor coating on the tube screen and thus leave a spot of no illumination.

In accordance with the present invention and as shown in one embodiment as enclosed within the dashed lines in FIGURE 1, a protection circuit for the picture tube includes a device having a voltage dependent resistance, such as a varistor 54.

In general, the characteristics of a varistor are such that as a voltage developed across it decreases, the resistance of the varistor increases.

In the circuit of FIGURE 1 the varistor 54 is serially connected with voltage dropping resistors 56 and 58 between a B+ supply and ground. A capacitor 60 is connected across the varistor 54 to protect it from damage due to high voltage arcing within the picture tube. Connection is made from the junction of resistor 56 and varistor 54 to the first grid 28 of picture tube 26 to apply the voltage developed across the varistor 54 between the grid 28 and the cathode 24. Connection is also made from the second grid 30 to the junction of resistors 58 and 56 to bias grid 30. The resistive values of the resistors and varistor in the divider network are chosen to supply selected bias voltages on the picture tube electrodes 28 and 30 relative to the cathode voltage for proper operation of the picture tube, with receiver power on, in a manner known in the art. The picture tube illustrated in FIGURE 1, may for example, be an RCA type 16CHP4.

When receiver power is turned off, as by the opening of switch 48, the B+ voltage starts to decay. As B+ decays, the resistance of the varistor 54 increases tending to hold the voltage developed across the varistor 54 initially constant. This means that the voltages at grids 28 and 30 of the picture tube 26 will not decay at the same rate as the cathode 24 voltage, so that the grid 28 and grid 30 voltages become less negative relative to the cathode. Thus sufficient beam current flows to discharge the second anode 32 capacitance substantially before the deflection fields collapse to eliminate the bright spot after the receiver has been turned off. In other words, when the receiver is turned off, the bias on the picture tube changes in the direction which tends to increase picture brightness and to maintain the electron current of sufficient density to rapidly discharge the second anode 32 capacitance.

A particular set of values for the protection circuit shown in FIGURE 1 which has provided satisfactory operation is set forth below. It will be appreciated that these values are given by way of example only:

| | | |
|---|---|---|
| Picture tube **26** | | 16CHP4 |
| B+ | volts D.C. | 150 |
| Resistor **56** | ohms | 47,000 |
| Resistor **58** | do | 47,000 |
| Capacitor **60** | microfarad | 0.1 |
| Varistor **54** | | [1] 47BNR–25 |

[1] Manufactured by Carborundum Company, Niagara Falls, N.Y.

It will be noted that in FIGURE 1, instead of returning the picture tube second grid 30 to the junction of resistors 56 and 58 in the varistor divider network, the grid 30 could be connected directly to a voltage source independent of the varistor and of sufficient magnitude to provide the desired grid 30 bias. In this case, as the B+ decays, the voltage at grid 28 will not decay at the same rate as the cathode 24 voltage so as to allow sufficient beam current to flow to discharge the second anode capacitance before the deflecting fields collapse. A picture tube such as RCA type 19DQP4 has been used satisfactorily with this arrangement.

In FIGURE 2 there is illustrated a second embodiment of a protection circuit embodying the invention. The circuit includes a resistor 62 and a varistor 64 serially connected between B+ and ground to form a voltage divider network for supplying a bias voltage to the second grid 66 of a picture tube 68 as shown. The first grid 70 of the picture tube is connected to ground. When the receiver power is turned off, the varistor 64 tends to keep the voltage supplied to grid 66 constant thereby providing quick discharge of the picture tube second anode 72 to ground capacitance in a manner similar to that heretofore described.

What is claimed is:

1. In an image display receiver, the combination comprising:

a cathode ray tube having a cathode, a control grid for controlling the intensity of a cathode ray beam and an accelerating anode capacitance charged to a high voltage during receiver operation;

a source of positive voltage;

voltage divider means including a voltage dependent resistor connected across said source of positive voltage; and means connecting said voltage dependent resistor in a direct current circuit path between said cathode and said control grid to control the grid to cathode bias of said tube during decay of said positive voltage when the receiver power is cut off in a direction to maintain said cathode ray beam and enhance the discharge of said anode capacitance.

2. In a television receiver, the combination comprising:

a cathode ray tube having a cathode, first and second control grids for controlling the intensity of a cathode ray beam, and an accelerating anode capacitance charged to a high voltage during receiver operation;

a source of positive voltage;

voltage divider means including a voltage dependent resistor connected across said source of positive voltage, said divider means having a first tap connected to said first control grid for providing an operating first grid to cathode bias potential, and a second tap connected to said second control grid for providing an operating second grid to cathode bias potential; and means connecting said voltage dependent resistor in a direct current circuit path between said cathode and the first and second control grids to control the first and second grid to cathode bias potentials of said tube during decay of said voltage when the receiver power is cut off in a direction to maintain said cathode ray beam and enhance the discharge of said anode capacitance.

3. In a television receiver, the combination comprising:

a cathode ray tube having a cathode, first and second control grids for controlling the intensity of a cathode ray beam, and an accelerating anode capacitance charged to a high voltage during receiver operation;

a source of positive voltage;

means connecting said first control grid to a ground potential;

voltage divider means including a voltage dependent resistor connected across said source of positive voltage; and means connecting said voltage dependent resistor in a direct current circuit path between said cathode and said second control grid to control the grid to cathode bias of said tube during decay of said positive voltage when the receiver power is cut off in a direction to maintain said cathode ray beam and enhance the discharge of said anode capacitance.

References Cited

UNITED STATES PATENTS

| | | | |
|---|---|---|---|
| 2,543,831 | 3/1951 | Bushman | 315—20 |
| 2,638,562 | 5/1953 | Schipper et al. | 315—20 |

FOREIGN PATENTS

| | | |
|---|---|---|
| 1,160,002 | 12/1963 | Germany. |

RODNEY D. BENNETT, *Primary Examiner.*

B. L. RIBANDO, *Assistant Examiner.*